A. B. THOMPSON.
PISTON PACKING RING.
APPLICATION FILED NOV. 3, 1919.
1,360,820.
Patented Nov. 30, 1920.
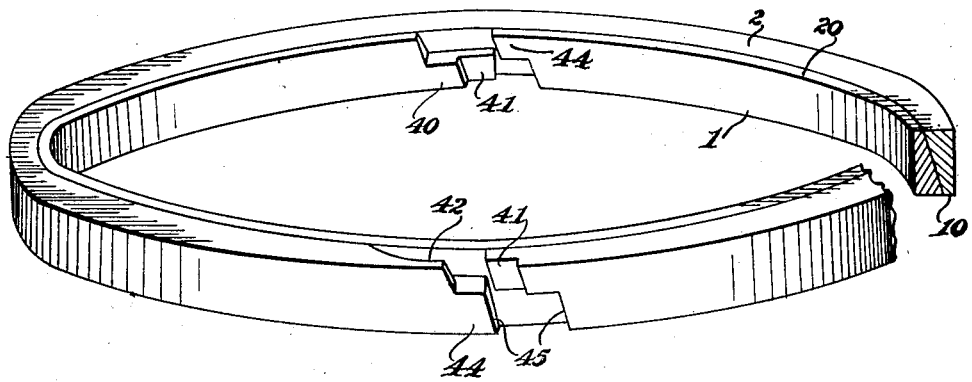
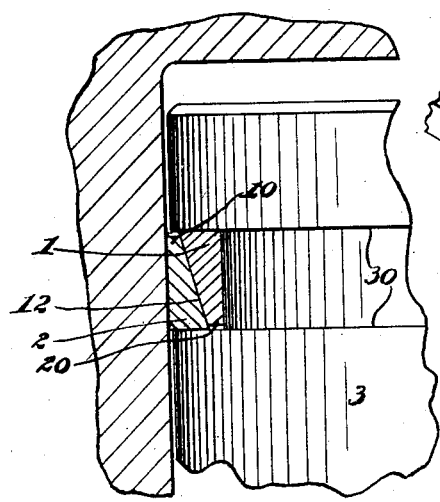
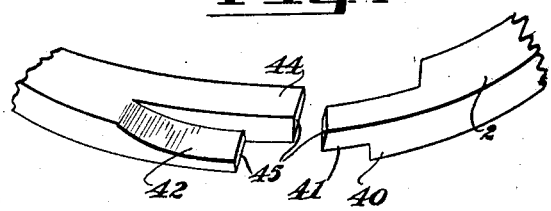
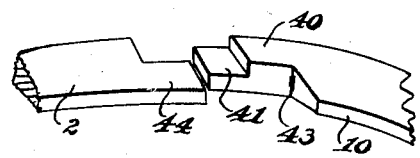
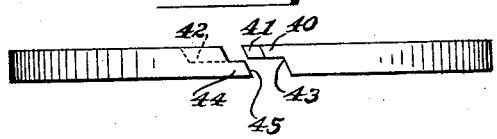
INVENTOR
Arthur B. Thompson.
BY
Reynolds & Cook
ATTORNEYS.

UNITED STATES PATENT OFFICE.

ARTHUR B. THOMPSON, OF SEATTLE, WASHINGTON.

PISTON PACKING-RING.

1,360,820.

Specification of Letters Patent.

Patented Nov. 30, 1920.

Application filed November 3, 1919. Serial No. 335,505.

*To all whom it may concern:*

Be it known that I, ARTHUR B. THOMPSON, a citizen of the United States, and resident of the city of Seattle, county of King, and State of Washington, have invented certain new and useful Improvements in Piston Packing-Rings, of which the following is a specification.

My invention relates to piston rings and consists in a novel form of construction whereby I secure a superior product of this kind.

The object of my invention is to provide a piston ring which may be kept more securely tight, and in which the leakage is less likely to occur than in other form of rings.

The features of my construction which I believe to be new, and upon which I desire a patent, will be herein set forth and then particularly defined by the claims.

In the accompanying drawings I have shown the manner of constructing rings in accordance with my invention.

Figure 1 shows in perspective, a pair of rings associated in the relation occupied when in use, except that they are in relaxed position; that is, with ends separated as they would be when unrestrained.

Fig. 2 shows a section of a cylinder and piston with a pair of rings also in section.

Fig. 3 is a face view of one of the rings showing the meeting ends slightly separated.

Figs. 4 and 5 are perspective views showing the meeting ends of a ring from the exterior and interior, respectively.

In accordance with my invention the piston rings are made in pairs, the same consisting of an outer and an inner ring, both occupying the same groove in the piston. These rings are both expansion rings; that is, they are cut at one point and provided with joints so that when compressed by insertion in the cylinder the ends will meet.

When put together the rings are as is clearly shown in Figs. 1 and 2. The contacting surfaces of the two rings, being the inner surface of one and the outer surface of the other, are made conical, as shown at 12 in Fig. 2. These conical surfaces at the thin side of each ring are separated somewhat from the opposite face of the ring, so as to leave a surface as 10 and 20 of a material width, that is, a surface that is not a sharp edge. This surface 10 of the outer ring and 20 of the inner ring, is of such size as to form a material contact with the side face of the groove 30 in the piston 3.

These rings should be made as snug a fit in the groove as is practicable. If made a sung fit there would be a small chance of leakage past the side face of the ring into the space in the groove beneath or within the ring. In placing the two rings together, the joints of the respective rings would be placed at opposite sides, or at least so that they will not match with each other.

The form of joint employed for the ends of the ring has been illustrated in the figures of the drawing. The ends of the ring are divided along a central line, and the construction at each side of this central line differs. At the thick side of the ring is formed a projecting tongue, as 40. Substantially half of the length of this tongue at its base is left the full thickness of the ring. The outer end of this tongue is reduced in thickness, so as to form a terminal section as 41, of much less thickness.

This construction applies to one end of the ring. The other end of the same ring has the half which lies at the thick side of the ring, cut down, so as to form a thin web 42, as is clearly shown more particularly in Fig. 4. The two portions 41 and 42, when brought together will overlap and together will complete the closed section of this half of the ring. When in place these two parts of the ring will at all times be overlapped and thus prevent any filtration of the steam through the ring at this point.

In the other half of the width of the ring, a cut, as 43, is made in one end and a projecting tongue 44 will abut against the bottom of the recess 43. However, when wear occurs these will begin to separate, and will thus leave a crack extending to the other ring. However, as the joints in the two rings do not coincide, there will be no leakage to the bottom of the groove, as one ring will be integral at the joint in the other and prevent passage of the steam or gases. The end surfaces of the rings which contact, may be cut on a bevel as is shown at 45 in Figs. 1 and 3, or square across, as desired; this is immaterial.

The two overlapping portions 41 and 42 are placed at the thick side of the ring, because at the opposite side of the ring it is not thick enough to form sufficiently substantial overlapping ends. As two rings are used, one inside of the other, the edges of each ring serves to close whatever joint there may be in the remaining half of the other ring. In consequence, leakage cannot occur to the bottom of the groove. The two rings having inclined or conical contacting surfaces, whatever steam pressure may leak past or get to the inner side of the combined ring, will serve to force the rings outward and thus by reason of the inclined surfaces, push the rings laterally, so that the thick edges make a tight contact with the side walls of the groove in the piston. In consequence, this pressure, as well as the spring force of the rings, acts to hold the rings tightly against the side walls of the groove, and thus maintain tight joints. At the same time this inclination is not made sufficiently great to produce excessive pressure, and also by reason of the modern inclination of these contacting surfaces, the rings may be made comparatively thin in a radial direction and yet not bring their thin edges to a sharp edge.

What I claim as my invention is:—

1. A piston ring composed of two expansion rings placed one within the other and having conical contacting surfaces, the meeting ends of said rings being cut on a central plane to form two overlapping tongues, the tongue which is at the thicker side of the ring being longer than the tongue which is at the thinner side, said longer tongue having an end section cut away to thin it in a radial direction and the other end of the ring being complementally recessed to receive said thinned end section of the longer tongue.

2. A piston ring having one peripheral surface coned and with its ends cut upon a central radial plane to form two overlapping tongues, the tongue which is at the thicker side of the ring being longer than the one which is at the thinner side and being also cut away at its outer end to thin it in a radial direction, the other end of the ring being complementally recessed to receive said thinner end of the said tongue.

Signed at Seattle, Washington, this 15th day of October, 1919.

ARTHUR B. THOMPSON.